Patented Apr. 13, 1943

2,316,665

UNITED STATES PATENT OFFICE 2,316,665

PRODUCTION OF IRON AND STEEL

Herman A. Brassert, Rye, N. Y., and Selwyne Perez Kinney, Crafton, Pa., assignors to Minerals and Metals Corporation, New York, N. Y., a corporation of Delaware No Drawing. Application January 6, 1941, Serial No. 373,304

8 Claims. (Cl. 75—32)

This invention relates to the production of iron or steel suitable for use in the manufacture of commercial products, and particularly to a process of producing iron or steel which makes possible the utilization, for this purpose, of ores heretofore considered to be impracticable for use in the production of commercially usable iron and steel because of impurities contained therein which are so intimately bonded with the iron oxide that none of the known mechanical methods of beneficiation would serve to release the impurities.

A general object of the invention is to take advantage of impurities usually found in iron ores to facilitate the production from directly reduced finely divided ores of an end product having characteristics similar to those of wrought iron or lying between wrought iron and steel.

Heretofore it has been considered to be impossible to use, in the production of commercially usable iron or steel, hematite ores in which the gangue constituents are so closely bound up with the hematite or ferric oxide that it is impossible to separate them by physical means. If ores of this character are reduced in a blast furnace with the gangue still bonded to the ferric oxide, the finished product will be contaminated with clusters of inclusions of silica, alumina and other materials which do not bond with the iron grain and therefore cause brittleness and loss of strength.

The form of iron known to the trade as wrought iron comprises iron approximately free from carbon but containing within its structure a considerable admixture of slag constituents, among which are usually iron oxide and silica, possibly, to some extent, combined in the form of iron silicate. These slag constituents are, however, so proportioned and so distributed in the iron that the slag bonds with the grain of the iron and does not materially reduce the strength of the product, the slag usually appearing in the iron in the form of stringers extending along the direction of rolling of the iron. Wrought iron has a very definite place in the economics and markets of the iron and steel industry and the production of a high grade wrought iron is, therefore, very much to be desired.

Wrought iron, as made by the former common method of manufacture, which is still used to a considerable extent, that is by means of the puddling process, varied somewhat in its composition and physical structure because so much was dependent upon the skill of the operator. Wrought iron as produced by the newer Aston-Byers process is of more uniform composition and quality, this process having been developed to meet the demand for a dependable product. Such a dependable product is obtained by manufacturing a synthetic wrought iron by a series of steps that can be performed substantially wholly by machinery. In this respect this newer process differs markedly from the former procedure which involved the hard and difficult labor of hand puddling.

While the Aston-Byers process makes a much more uniform product and makes possible production on a very much larger scale than the puddling process, some of the sponge balls handled in this process weighing from 6000 to 8000 lbs. each as compared with the 200 or 300 lb. balls of the hand puddling process, the procedure is expensive, particularly because the pig iron must be subjected to so many operations before it is finally converted into the wrought iron end product. Moreover, the end product is not always of the degree of purity desired.

In United States Letters Patent No. 1,330,846 is disclosed a process of making wrought iron in which an attempt has been made to avoid the pig iron melting step.

The process described in the said Letters Patent No. 1,330,846, while it avoids the melting of the iron, does not avoid the melting of the gangue constituents of the iron ore during the reducing operation and therefore necessarily interferes with the reducing reaction by at times preventing the requisite contact of the reducing agent with the iron oxide. If sufficient carbon be present to insure approximately complete reduction under these circumstances then there would doubtless be too much carbon in the end product.

The present invention aims to provide a process for producing wrought iron or steel, containing a low and uniform percentage of included gangue, which is more economical in practice and yet which will produce an end product as desirable or even more desirable than those produced by the processes of the prior art. More particularly, the invention aims to provide a process for producing an end product having the characteristics of the best grades of wrought iron, or lying between wrought iron and steel, which will make possible the use for this purpose of ores not utilizable in the production of iron and steel by processes heretofore employed.

To this end the invention aims to reduce finely divided iron ores having a substantial proportion of gangue constituents either associated or bound up therewith, the reduction being effected directly, and preferably by means of reducing gases, at temperatures below the fusion temperatures of any of the ore constituents, and, before fusion is effected of any of the gangue, forming a self-sustaining mass of the reduced powder and, if necessary, adding to the powder, before the self-sustaining mass is formed, such constituents as are required for fluxing and/or to produce the desired slag inclusions in the finished product.

As brought out in the co-pending application of Herman A. Brassert, Serial No. 369,053, filed December 7, 1940, U. S. Letters Patent No. 2,287,663, granted June 23, 1942; it has been discovered that, if a directly reduced iron ore, reduced at a temperature below the fusion point of any of the constituents thereof, be compressed while the reduced powder is still hot from the reducing operation, is still in a reducing or non-oxidizing atmosphere and is therefore still substantially free of any surface contamination and, therefore, marked by a chemical activity at the surface greater than the ordinary, a self-sustaining mass or solid can be formed with a minimum of pressure. By taking advantage of this characteristic of freshly reduced iron ores, reduced in the manner hereinabove set forth, it will be seen that a ball, having both the gangue constituents of the ore and any desired powdered additions thereto uniformly distributed throughout the structure and substantially free from carbon, can be formed before the gangue is brought into a molten condition and that therefore no melting either of the iron or of the slag constituents need take place until shortly before the squeezing operation. It will further be seen that melting of the iron can be wholly avoided, since the fusion temperature of the slag is below that of the iron and since the iron does not need to be raised to the fusion temperature for any of the subsequent working or fabricating operations.

In the preferred method of practicing the present invention, the ore to be employed in producing the end product and which may contain a high percentage of gangue, even after some beneficiating treatment, for example 10% or 12% of gangue, is preferably crushed or ground, if not already in a sufficiently finely divided state, to bring it into a state in which it can readily be reduced by reducing gases. The ore having been prepared for reduction by bringing it into a finely divided state, the reduction can be carried out in any suitable manner, as, for example, by the process described and claimed in the co-pending application of Herman A. Brassert and James C. Hartley, Serial No. 360,418, filed October 9, 1940, Process of and apparatus for facilitating and controlling chemical reactions and physical treatments.

As set forth in said co-pending application above identified, the finely divided ore is charged upon a hearth provided with jet orifices through which preheated reducing gases can be forced under sufficient pressure to cause them to thoroughly permeate and render fluent the mass of ore on the hearth and thus come into intimate reactive relation to the particles of the ore while at the same time facilitating the movement of the ore over the hearth. By the method and means set forth in said co-pending application effective reduction of iron ores can be brought about. The process of said co-pending application Serial No. 360,418 and the apparatus employed therewith are described sufficiently for the purposes of the present application in U. S. Letters Patent No. 2,287,663, granted June 23, 1942.

As set forth in the co-pending application of Herman A. Brassert, Serial No. 369,053, filed December 7, 1940, now matured into said U. S. Letters Patent No. 2,287,663, granted June 23, 1942, if the finely divided reduced ore be then subjected to a compacting pressure while it is still hot from the reducing operation, while it is still in a reducing or non-oxidizing atmosphere and while it is therefore still substantially free of any surface contamination and, therefore, marked by a chemical activity at the surface greater than the ordinary, self-sustaining masses may readily be formed without the exertion of much pressure. Moreover, these masses, if desired, may be caused to have a specific gravity greater than that of molten slag for a purpose hereinafter to be more fully set forth.

If the gangue constituents of the reduced finely divided ore be fusible at the desired temperature and contain the elements desired in the slag inclusions in the final product, this finely divided reduced ore, after having been subjected to a pressure sufficient to consolidate it into a mass of the size and shape desired for the subsequent slag squeezing operation, is then heated to a temperature sufficient to cause the gangue constituents to melt and is then taken either to the usual slag expressing press employed in the manufacture of wrought iron or to an ordinary press, or the slag may be expressed from the consolidated mass of reduced ore by means of an extruding press or by rolling or forging. In this manner and by these means the gangue may be reduced to the desired percentage, say from the above-mentioned 10% or 12% in the ore before reduction, to approximately 2% or less.

If, as above suggested, the original gangue has included the elements desirable in the slag inclusions in the finished product, then the finished product, as made in the manner above set forth, will have, without further treatment between the reducing and slag expressing operations, the characteristics of a good wrought iron. It may be, however, that in the case of some ores either the silica in the gangue is not in the right proportion to give final slag inclusions of the desired character, or it may be that the gangue is not fusible at the desired temperatures. In such case, while still using the natural gangue in the ore as the basis for the ultimate slag, such additions may be made to the ore, either before or after reduction, as will not only facilitate the liquefaction of the slag by lowering its melting point, but will also help to eliminate objectionable elements found in the ore, such as sulfur and phosphorus. Additions suitable for this purpose are lime and fluorspar. As above suggested, the finely divided lime or limestone or finely divided fluorspar may be added to and thoroughly mixed with the finely divided ore before reduction, or either or both may be added to the finely divided reduced ore, preferably in a preheated condition, and thoroughly mixed therewith before the compression of the reduced ore into a self-sustaining mass.

Still another way of obtaining the same result, that is, a satisfactory reduction of the ore and a thorough commingling of the slag with the particles of iron powder before the slag expressing operation, is to prepare a molten bath of the slag constituent or constituents which are to be added to the reduced gangue-containing ore, then to compress the reduced gangue-containing ore into a loosely compacted mass of just sufficient specific gravity readily to submerge in the molten bath of the slag additions and then to cause the compacted mass to be submerged in the molten bath of slag additions. In this case the molten bath of slag additions will not only supply heat to cause the fusion of the gangue constituents of the reduced ore, but the bath will penetrate the loosely compacted mass and fuse together with these gangue constituents, thus leaving the iron in a pure state. After the fusion has proceeded to the desired extent and the compacted mass has become thoroughly impregnated with slag of the desired composition, it may be removed from the bath and subjected to the slag expressing operations hereinabove described. That is, it may be squeezed in an ordinary slag expressing press or the slag may be expressed by forcing the mass through an extruding press or the mass may be operated upon by rolls or a forging press.

From the foregoing description it will be seen that the process of the present invention makes possible the utilization, for the production of iron or steel suitable for use in the manufacture of commercial products, of ores which have their gangue constituents so bonded to the iron oxide that they cannot readily be prepared for reduction by ordinary processes. It will further be seen that, by effecting the reduction of the iron oxide before the fusing of the gangue constituents which are to form a part of the slag, not only is proper reduction insured, but also thorough distribution of the slag throughout the mass of iron, which is later to be subjected to the slag expressing pressures, is insured. In fact, it is probable that the distribution of the slag throughout the mass which is later to be subjected to slag expressing pressures is more thorough than by any of the processes of the prior art.

We are aware of United States Letters Patent No. 1,851,376, March 29, 1932, and 1,892,740, January 3, 1933, to William H. Smith, in which are disclosed methods of fluxing and washing out gangue residues found in sponge iron, but the processes of these patents proceed in a different manner to produce a different end product and therefore have not attained the simple solution of the problem of producing from ores, heretofore considered to be impracticable for such use, iron or steel suitable for use in the manufacture of commercial products.

What is claimed as new is:

1. The process of making iron or steel, which consists in directly reducing, at temperatures below the fusion temperature of any of its constituents, a finely divided iron ore having a substantial proportion of gangue constituents still intimately associated with the iron oxide, compressing the powdered product of the reducing operation, while still hot from said operation, into a self-sustaining mass, raising the temperature of said mass to the fusion temperature of the gangue constituents and then subjecting said mass to slag-expressing squeezing operations until the slag content thereof has been reduced to the desired degree, the compressing of the powdered product of the reducing operation being carried out while the powdered iron is also still in a reducing or non-oxidizing atmosphere and while it is therefore still substantially free of any surface contamination and, therefore, marked by a chemical activity at the surface greater than the ordinary.

2. A process according to claim 1 in which an ore is selected having silica among the gangue constituents thereof.

3. A process according to claim 1 in which a suitable addition is made to natural gangue deficient in a constituent needed to produce a slag inclusion of the desired composition and physical characteristics.

4. A process according to claim 1 in which after reduction and before compression a suitable addition is made to the gangue of a natural ore which is deficient in a constituent needed to produce a slag of the desired fusion temperature.

5. A process according to claim 1 in which lime is added to the natural gangue of the ore.

6. A process according to claim 1 in which fluorspar is added to the natural gangue of the ore.

7. A process according to claim 1 in which an addition to the natural gangue of the ore to produce a slag of the desired composition and fusion point is made before the reduced ore is compressed into a self-sustaining mass.

8. The process of making iron or steel, which consists in directly reducing, at temperatures below the fusion temperature of its constituents, a finely divided iron ore having a substantial proportion of gangue constituents still intimately associated with the iron oxide, compressing the powdered product of the reducing operation, while still hot from said operation, into a self-sustaining mass, immersing the self-sustaining mass thus produced in a molten bath of a slag which consists of such an addition to the natural gangue of the ore as is required to produce a slag inclusion in the final product having the desired composition and melting temperature, and then subjecting said mass to slag-expressing squeezing operations until the now molten entire slag content thereof has been reduced to the desired degree.

HERMAN A. BRASSERT.
SELWYNE PEREZ KINNEY.